US005897789A

United States Patent [19]

Weber

[11] Patent Number: 5,897,789

[45] Date of Patent: Apr. 27, 1999

[54] VALVE ASSEMBLY FOR CONTROLLING FLUID FLOW WITHIN AN INK-JET PEN

[75] Inventor: Timothy L. Weber, Corvallis, Oreg.

[73] Assignee: Hewlett-Packard Company, Palo Alto, Calif.

[21] Appl. No.: 09/099,075

[22] Filed: Jun. 17, 1998

Related U.S. Application Data

[62] Division of application No. 08/548,837, Oct. 26, 1995.

[51] Int. Cl.[6] .......................... G01D 15/16; G01D 15/18; B44C 1/22

[52] U.S. Cl. ................................. 216/27; 347/85; 438/21

[58] Field of Search .................................... 216/2, 56, 27; 438/21

[56] References Cited

U.S. PATENT DOCUMENTS

| | | | |
|---|---|---|---|
| 4,480,259 | 10/1984 | Kruger et al. | 346/140 R |
| 4,631,554 | 12/1986 | Terasawa | 346/140 R |
| 5,029,805 | 7/1991 | Albarda et al. | 251/11 |
| 5,058,858 | 10/1991 | Gordon et al. | 251/11 |
| 5,129,794 | 7/1992 | Beatty | 417/413 |
| 5,278,585 | 1/1994 | Karz | 347/94 X |
| 5,317,346 | 5/1994 | Garcia | 346/140 R |
| 5,457,485 | 10/1995 | Moriyama et al. | 347/92 |
| 5,619,177 | 4/1997 | Johnson | 347/251 |

FOREIGN PATENT DOCUMENTS

| | | | |
|---|---|---|---|
| 0314285A1 | 9/1988 | European Pat. Off. | F16K 7/14 |
| 436 047 | 7/1991 | European Pat. Off. | B41J 2/055 |

OTHER PUBLICATIONS

Gary Stix, "Micron Machinations," Scientific American, Nov. 1992, pp. 105–114.

Wolffenbuttle, et al., "Design Considerations for a Permanent–rotor–charge–Micromotor With and Electrostatic Bearing," Sensors and Actuators A., Jan. 1991, pp. 583–590.

Matsumoto and Colgate, "Preliminary Investigation of Micropumping Based on Electrical Control of Interfacial Tension," IEEE, Apr. 1990, pp. 105–110.

Richter and Sandmaier, "An Electrohydrodynamic Micropump," IEEE, Apr. 1990, pp. 99–104.

Jerman, "Electrically–Activated, Macromachined Diaphragm Valves," IEEE, Sep. 1990, pp. 64–69.

Nakagawa and Esashi, "Micropump and Sample–injector for Integrated Chemical Analyzing Systems," Sensors and Actuators, A21–A23, Jan. 1990, pp. 189–192.

Guckel, burns and Rutigliano, "Design and Construction Techniques for Planar Polysilicon Pressure Transducers with Piezoresistive Read–Out," Jan. 1986, 2 pages.

Fan, Tai and Muller, "Integrated Movable Micromechanical Structures for Sensors and Actuators," IEEE Transactions on Electron Devices, vol. 35, No. 6, Jun. 1988, pp. 724–730.

*Primary Examiner*—Bruce Breneman
*Assistant Examiner*—Alva Powell

[57] ABSTRACT

The channels through which ink flows to the firing chambers of an ink-jet printhead are provided with selectively controlled valves for restricting flow at specified times for reducing blowback from the firing chamber while decreasing the turn on energy of the printhead.

2 Claims, 3 Drawing Sheets

VALVE ASSEMBLY FOR CONTROLLING FLUID FLOW WITHIN AN INK-JET PEN

CROSS REFERENCE TO RELATED APPLICATION

This is a divisional of copending application Ser. No. 08/548,837 filed on Oct. 26, 1995.

FIELD OF THE INVENTION

The present invention relates to the control of fluid flow within an ink-jet printhead.

BACKGROUND AND SUMMARY OF THE INVENTION

An ink-jet printer includes a pen in which small droplets of ink are formed and ejected toward a printing medium. Such pens include printheads with orifice plates with several very small nozzles through which the ink droplets are ejected. Adjacent to the nozzles are ink chambers, where ink is stored prior to ejection through the nozzle. Ink is delivered to the ink chambers through ink channels that are in fluid communication with an ink supply. The ink supply may be, for example, contained in a reservoir part of the pen.

Ejection of an ink droplet through a nozzle may be accomplished by quickly heating a volume of ink within the adjacent ink chamber. The thermal process causes ink within the chamber to superheat and form a vapor bubble. Formation of thermal ink-jet vapor bubbles is known as nucleation. The rapid expansion of ink vapor forces a drop of ink through the nozzle. This process is called "firing." The ink in the chamber may be heated with a resistor that is aligned adjacent to the nozzle.

Another mechanism for ejecting ink may employ a piezoelectric element that is responsive to a control signal for abruptly compressing a volume of the ink in the firing chamber thereby to produce a pressure wave that forces the ink droplets through the printhead nozzle.

Previous ink-jet printheads rely on capillary forces to draw ink through an ink channel and into an ink chamber, from where the ink is ejected. Once the ink is ejected, the ink chamber is refilled by capillary force with ink from the ink channel, thus readying the system for firing another droplet.

As ink rushes in to refill an empty chamber, the inertia of the moving ink causes some of the ink to bulge out of the nozzle. Because ink within the pen is generally kept at a slightly positive back pressure (that is, a pressure slightly lower than ambient), the bulging portion of the ink immediately recoils back into the ink chamber. This reciprocating motion diminishes over a few cycles and eventually stops or damps out.

If a droplet is fired when the ink is bulging out the nozzle, the ejected droplet will be dumbbell shaped and slow moving. Conversely, if the ink is ejected when ink is recoiling from the nozzle, the ejected droplet will be spear shaped and move undesirably fast. Between these two extremes, as the chamber ink motion damps out, well-formed drops are produced for optimum print quality. Thus, print speed (that is, the rate at which droplets are ejected) must be sufficiently slow to allow the motion of the chamber to damp out between each droplet firing. The time period required for the ink motion to damp sufficiently may be referred to as the damping interval.

To lessen the print speed reduction attributable to the damping interval, ink chamber geometry has been manipulated. The chambers are constricted in a way that reduces the ink chamber refill speed in an effort to rapidly damp the bulging refilling ink front. Generally, chamber length and area are constructed to lessen the reciprocating motion of chamber refill ink (hence, lessen the damping interval). However, printheads have been unable to eliminate the damping interval. Thus, print speed must accommodate the damping interval, or print and image quality suffer.

Ink-jet printheads are also susceptible to ink "blowback" during droplet ejection. Blowback results when some ink in the chamber is forced back into the adjacent part of the channel upon firing. Blowback occurs because the chamber is in constant fluid communication with the channel, hence, upon firing, a large portion of ink within the chamber is not ejected from the printhead, but rather is blown back into the channel. Blowback increases the amount of energy necessary for ejection of droplets from the chamber ("turn on energy" or TOE) because only a portion of the entire volume of ink in the chamber is actually ejected. Moreover, a higher TOE results in excessive printhead heating. Excessive printhead heating generates bubbles from air dissolved in the ink and causes prenucleation of the ink vapor bubble. Air bubbles within the ink and prenucleation of the vapor droplet result in a poor ink droplet formation and thus, poor print quality.

The present invention provides an assembly that includes minute, active valve members operable for controlling ink flow within an ink-jet printhead. An embodiment of the valve assembly is incorporated in an ink channel that delivers ink to the firing chambers of the printhead. The valve members include a resiliently deformable flap connected at one end to a surface of the ink channel. The free end of the flap is deflected into a position that restricts ink flow within the channel. The flap substantially isolates the ink chamber from the channel during firing of a droplet.

Isolating the chamber with the flap reduces blowback. During ejection, ink in the chamber is blocked by the deflected flap and cannot blowback into the channel, but must exit through the nozzle. This blowback resistance raises the system thermal efficiency, lowering TOE. A lower TOE reduces printhead heating. Reducing printhead heating helps maintain a steady operating temperature, which provides uniform print quality.

With the flaps deflected in a manner such that the ink chamber is isolated immediately after chamber refill, the valve assembly of the present invention also reduces the ink damping interval. With the chamber isolated, the distance the ink may travel back from the nozzle is limited, which in turn reduces the reciprocating motion of the ink. Consequently, the ink damping interval is significantly decreased, allowing higher print quality at faster printing speeds.

DESCRIPTION OF PREFERRED EMBODIMENTS

Figure 1:
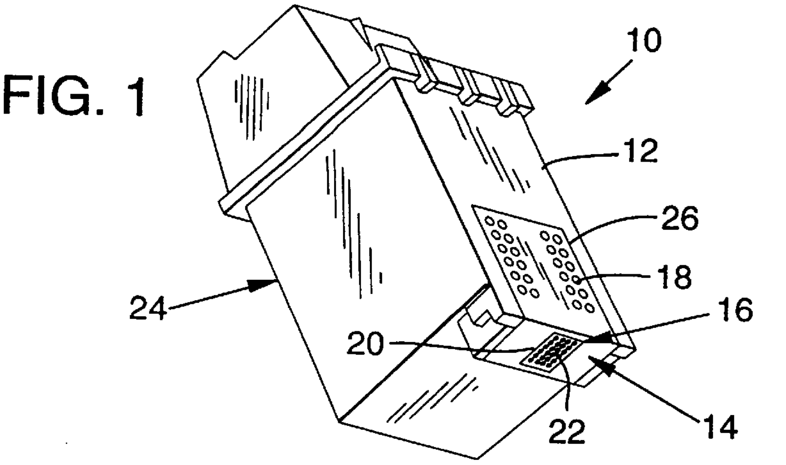
FIG. 1 is an isometric view of an ink-jet printer pen that includes a preferred embodiment of the valve assembly of the present invention.

Referring to FIG. 1, the valve assembly of the present invention is incorporated within an ink-jet pen 10. The preferred pen includes a pen body 12 defining a reservoir 24. The reservoir 24 is configured to hold a quantity of ink. A printhead 20 is fit into the bottom 14 of the pen body 12 and controlled for ejecting ink droplets from the reservoir 24. The printhead defines a set of nozzles 22 for expelling ink, in a controlled pattern, during printing. Each nozzle 22 is in fluid communication with a firing chamber 42 (FIG. 3) defined in the base 23 of printhead 20.

Each firing chamber 42 has associated with it a thin-film resistor 46. The resistors 46 are selectively driven (heated) with a sufficient current to instantly vaporize some of the ink in the chamber 42, thereby forcing a droplet through the nozzle 22. Conductive drive lines to each resistor 46 are carried upon a circuit 26 mounted to the exterior of the pen body 12. Circuit contact pads 18 (shown enlarged for illustration), at the ends of the resistor drive lines, engage similar pads carried on a matching circuit attached to the carriage (not shown). The signal for firing the resistors 46 is generated by a microprocessor and associated drivers that apply firing signals to the resistor drive lines.

The pen includes an ink supply within the pen reservoir 24. A supply conduit (not shown) conducts ink from the reservoir 24 to ink channels 28 defined in the printhead. The ink channels 28 are configured so that ink moving therethrough is in fluid communication with each firing chamber 42 and hence each nozzle 22.

Figure 2:
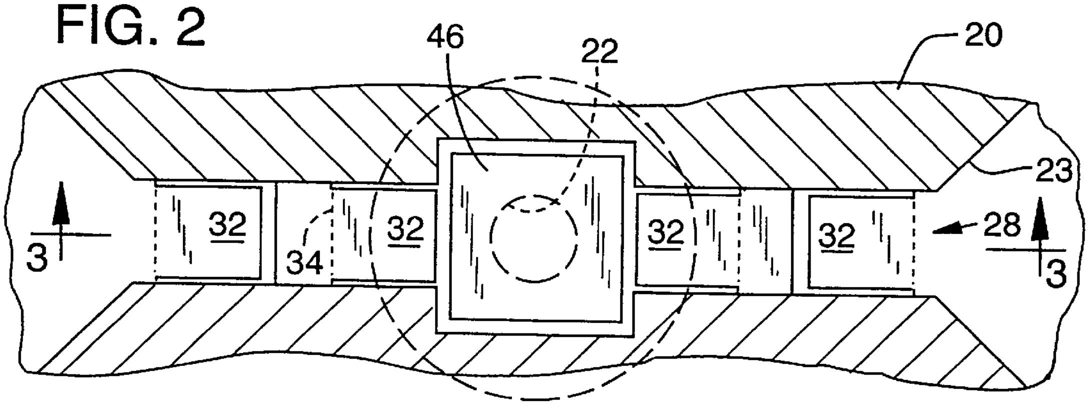
FIG. 2 is an enlarged top sectional view of the printhead portion underlying a pen nozzle, showing valves in a closed position.
Figure 3:
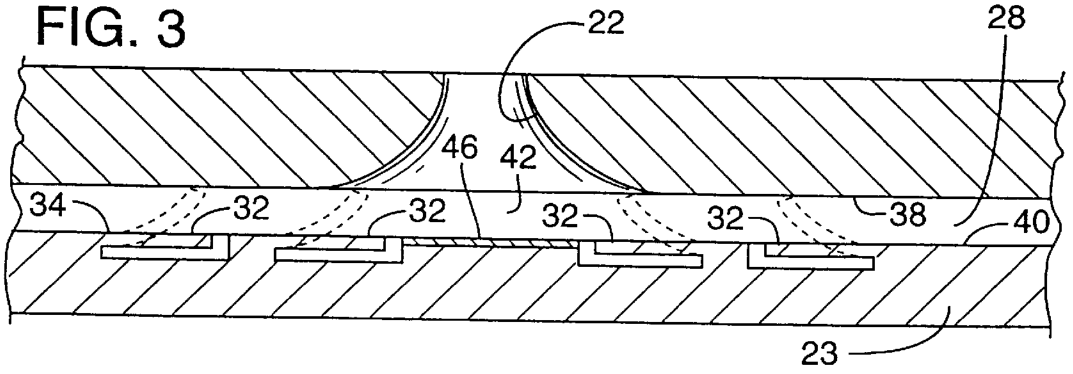
FIG. 3 is an enlarged cross-sectional view taken along line 3—3 of FIG. 2.
Figure 4:
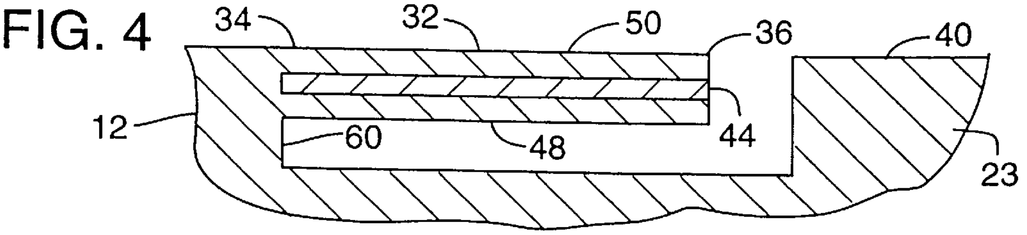
FIG. 4 is an enlarged cross-sectional view of a valve member of the present invention.

Referring generally to FIGS. 2–4, in a preferred embodiment of the present invention, the valve assembly comprises valve members (or flaps) 32 constructed of resiliently deformable materials, movable into and out of open and closed positions. The movable valve members 32 provide control of ink flow within the channel 28.

As best seen in FIGS. 3 and 4, a valve member 32 is connected at one, fixed end 34, to the base 23 of the printhead, preferably continuous with the lower surface 40 of the channel. The other, free end 36 of the valve member 32 is left free to move within the channel 28.

Preferably, a valve member 32 is placed on either side of and adjacent to the ink firing chamber 42 (FIG. 3). Such placement allows isolation of the chamber 42 when the valve members 32 are deflected. It is contemplated, however, that a single valve member could be used in designs where the chamber has a single connection with a channel.

The valve member 32 is deformable or deflectable into a position for restricting ink flow in the channel 28.

In accordance with a preferred embodiment of the invention, the valve members 32 are constructed of two layers or portions of deformable material. Each of the layers comprise materials possessing different coefficients of thermal expansion. When valve member 32 is heated, one layer of the valve member 32 undergoes relatively less thermal expansion than the other layer. The layers are arranged so that the differing thermal expansions cause the valve member 32 to deflect or bow in a direction toward the upper surface 38 of the channel. The layer materials possess coefficients of thermal expansion of sufficient difference to cause, upon heating, the valve member 32 to deflect enough to substantially occlude the channel 28.

Alternatively, the valve members 32 may be constructed of three layers of deformable material wherein the middle layer possesses high thermal conductivity. Thus, the middle layer will act as a heating element 44, causing the valve member 32 to deflect when heated (FIG. 4).

Referring to FIG. 4, in a preferred embodiment of the invention, the inner layer 48 (also referred to herein as a "first portion") of the valve member 32 comprises a material possessing a higher coefficient of thermal expansion relative to the outer layer 50 (also referred to as "second portion"). Upon heating of the valve member 32, the inner layer 48 thermally expands to a length greater than the outer layer 50. Consequently, the valve member 32 deflects in a direction toward the outer layer 50, depicted by dashed lines in FIG. 3. In a preferred embodiment, the valve member deflects toward the opposing or upper surface 38 of the ink channel 28 (FIG. 3).

The valve member 32 is heated, and hence opened or closed, by applying or removing current, respectively, to one of the layers. Current is applied to the layer acting as the heating element 44 (FIG. 4). The heating element 44 may be any electrically conductive layer of the valve member 32 that comprises a material having a high thermal conductivity.

Preferably, the valve member 32 is in an open position when the valve member 32 is not heated, as depicted by solid lines in FIG. 3. In the open position, the uppermost surface of the valve member is coplanar with the lower surface 40 of the channel 28. When in the open position, ink flows freely between the channel 28 and the firing chamber 42.

When a droplet is to be ejected, the valve members 32 are moved to a closed position, depicted by dashed lines in FIG. 3. FIG. 3 depicts a pair of valve members on each side of the chamber 42. A single valve member, however, on each side of the chamber should suffice. To close the valve members 32, current is applied to heat the layer acting as the heating element 44 of the valve member. The valve members 32 are selectively driven (heated) with a sufficient current to cause deflection. Drive lines to each valve member 32 are carried upon the circuit 26 that is mounted to the exterior of the pen body 12.

The valve members 32 are heated a sufficient amount to cause the outer end 36 of the valve member to deflect and contact the upper surface 38 of the channel 28. When a valve member 32 is deflected in such a manner, ink flow between the channel 28 and the chamber 42 is substantially occluded. Additionally, when the valve members 32 on either side of the chamber 42 are in a closed position, the ink chamber 42 is completely isolated from the chamber with the nozzle 22 being the only exit for ink from the chamber (FIG. 3). Such valving of the ink channel near the chamber reduces blowback and lowers TOE, as mentioned above.

In another embodiment of the invention (FIG. 5), the valve assembly 132 is coupled with a pressurized ink source. Pressurized ink is directed through channels 128 that are contiguous with each nozzle 122. The ink is pressurized a sufficient amount to expel an ink droplet through the nozzle 122.

Figure 5:
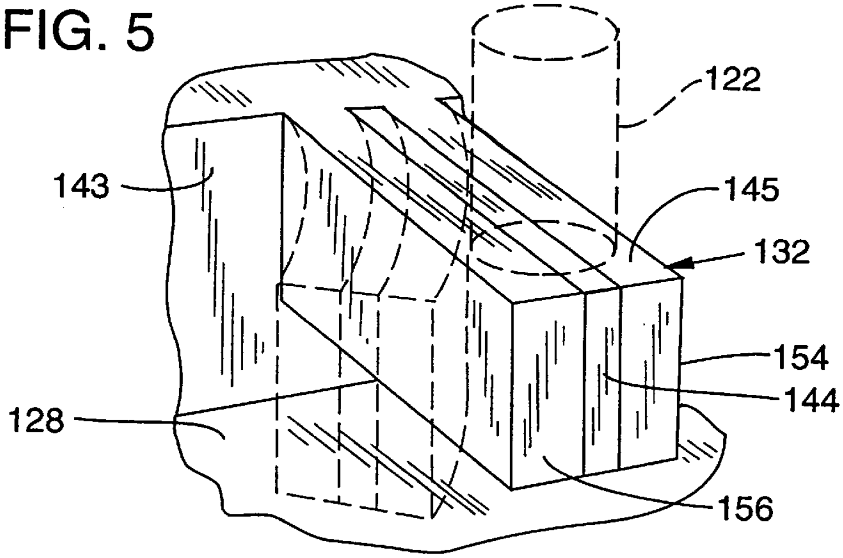
FIG. 5 is an enlarged perspective view of a valve assembly and nozzle in accordance with another preferred embodiment, the solid lines depicting the valve in a closed position and dashed lines depicting the valve in an open position.

Referring to FIG. 5, in this embodiment, the valve member 132 is positioned to protrude from a side wall 143 of the printhead base adjacent to a nozzle 122 so that the upper side 145 of the valve member 132 occludes the junction of the ink channel 128 and the nozzle 122. In FIG. 5, the nozzle is shown in dashed lines, having a generally cylindrical shape, although other shapes are acceptable.

Ink flow from the channel 128 into the nozzle 122 is completely occluded when the valve member 132 is in a non-deformed position (i.e. not heated), as depicted by solid lines in FIG. 5. The valve member 132 remains in the closed position until an ink droplet is to be ejected from the nozzle 122.

To eject a droplet from the nozzle 122, a pulse of current is applied to the heating element 144 of the valve member 132. The valve member then temporarily deflects to an open position. When the valve member 132 is in an open position, the pressurized ink flow within the channel 128 is in fluid communication with the nozzle 122. As a result, a droplet is ejected through the nozzle 122. The open position of the valve member 132 is depicted by the dashed lines in FIG. 5.

In this preferred embodiment, the valve member 132 deflects by the same operation as the preferred embodiments described above. The inner and outer layers 154, 156 of the valve member 132 are comprised of materials possessing different coefficients of thermal expansion, relative to one another. The inner layer 154 possesses the higher coefficient of thermal expansion. As current is applied to the heating element 144, the valve member temperature increases and the inner layer 154 undergoes a greater relative thermal expansion relative to the outer layer 156. The valve member 132 then deflects or bows in a direction toward the outer layer 156. The valve member 132 remains in an open position just long enough to allow an ink droplet to eject through the nozzle 122.

This embodiment (FIG. 5) allows ejection of ink without need for a resistor or other similar droplet firing device.

Figure 8:
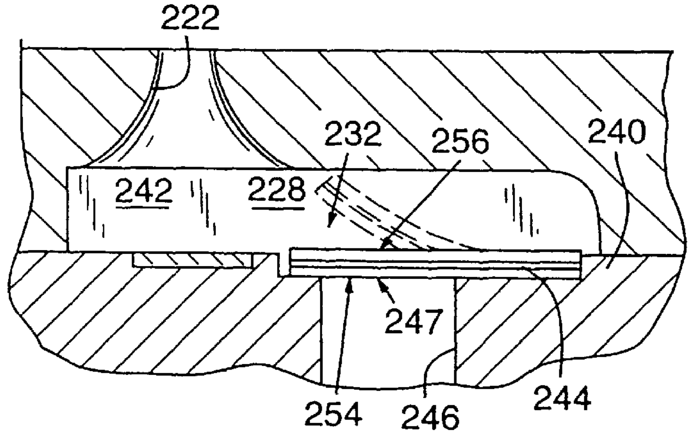
FIG. 8 is an enlarged cross-sectional view of a valve assembly and firing chamber in accordance with another preferred embodiment, the solid lines depicting the valve in a closed position and dashed lines depicting the valve in an open position.

In another preferred embodiment of the present invention (FIG. 8), the valve assembly 232 is mounted to the lower surface 240 of the ink channel 228. The valve assembly is located such that the lower side 247 of the valve member 232 covers the junction of the chamber and an ink inlet 246 that delivers ink from the pen reservoir to the ink channel 228. In FIG. 8, the ink inlet 246 is shown having a generally cylindrical shape, although other shapes are acceptable.

Ink flow from the ink inlet 246 to the ink channel 228 is occluded when the valve member 232 is in a non-deformed position (i.e. not heated) as depicted in FIG. 8. The valve member 232 remains in a closed position until an ink droplet has been ejected from the nozzle 222 and the ink chamber 242 requires refilling.

In this preferred embodiment, the valve member 232 deflects by the same operation as the preferred embodiments described above. The lower and upper layers 254, 256 of the valve member 232 are comprised of materials possessing different coefficients of thermal expansion relative to one another. The lower layer 254 possesses the higher coefficient of thermal expansion. As current is applied to a heating element 244, the valve member temperature increases and the lower layer 254 undergoes a greater thermal expansion relative to the upper layer 256. The valve member 232 then deflects or bows in a direction toward the upper layer 256. The valve member remains in an open position long enough to refill the ink chamber 242. This particular preferred embodiment ensures total occlusion of ink flow between the ink inlet and the ink chamber. Additionally, the ink chamber may be completely isolated such that ink blowback and the ink damping interval are greatly reduced.

The valve members 32, 132, 232 of the above described embodiments may comprise any of a variety of material layers. In a preferred embodiment, the valve member may comprise two layers of metal. Each metal layer possesses a different coefficient of thermal expansion (i.e. the valve member is bimetallic). The valve member may also comprise a layer of polyimide or a similar compound and a metal layer. In another preferred embodiment (FIGS. 4 and 5), the valve members 32, 132 comprise two polyimide layers with a conductive layer 44, 144 therebetween.

The general fabrication process (often referred to as microfabrication) of the valve assembly of FIGS. 2 and 3 is depicted in FIGS. 6A–6E, and explained next.

In a preferred embodiment the base 23 of the printhead comprises a substrate 58, also referred to as a thin-film stack. The substrate includes, from bottom to top, a p-type silicon layer having a thickness of about 675 mm, covered with a layer of silicon dioxide about 12,000 A thick; a passivation layer having a thickness of about 7,500 A; an electrically conductive aluminum layer having a thickness of about 1,000 A; a resistor layer having a thickness of about 5,000 A; and another passivation layer having a thickness of about 6,000 A. The conductor/resistor traces layer is configured to interconnect individual resistors and valve members with the appropriate drive signals generated by a microprocessor. In FIG. 6, the lower layers (silicon, silicon dioxide, lower passivation layer) are for convenience shown as a single layer **58*b*. The remaining upper layers at the bottom substrate are shown as a single layer 58*a***.

The thin-film stack substrate 58 is masked with positive or negative photoresist. The substrate 58 is then patterned and anisotropically etched through the conductor, resistor and passivation layer **58*a* of the substrate to define a via 60 for connection of the valve member 32 to the electrical traces layer within the substrate. The via 60 provides an electrical passageway for driving the valve member 38** through selective application of current, as explained below.

Figure 6A:
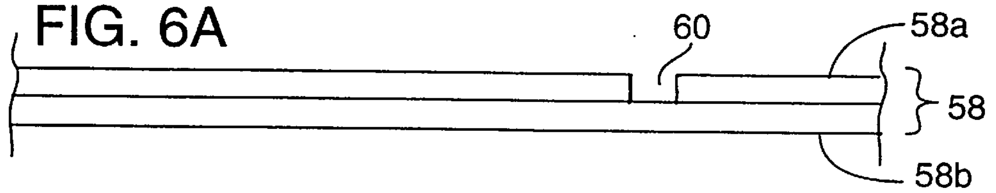
FIGS. 6A–E are section diagrams depicting fabrication of a valve assembly of the present invention.
Figure 6B:
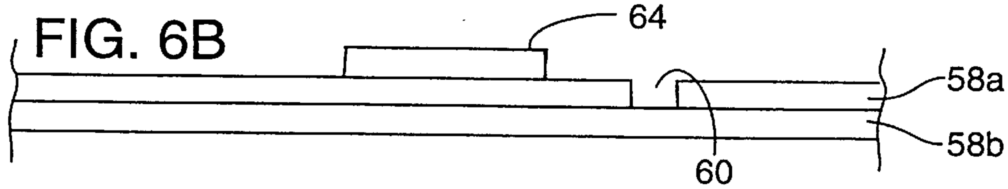

A sacrificial layer 64 is next deposited using low pressure chemical vapor deposition (LPCVD), plasma enhanced chemical vapor deposition (PECVD) or a spin-on process. The sacrificial layer 64 is preferably a low temperature oxide, but may also comprise a layer of photoresist or polyimide. Preferably, the sacrificial layer 64 is 1 to 2 microns in thickness. The sacrificial layer 64 is then patterned and etched to define what will be a clearance space directly beneath the valve member 32 (FIG. 6B). The patterned sacrificial layer 64 will be removed later in the fabrication process to enable one end of the valve member 32 to move free of the substrate 58.

Figure 6C:
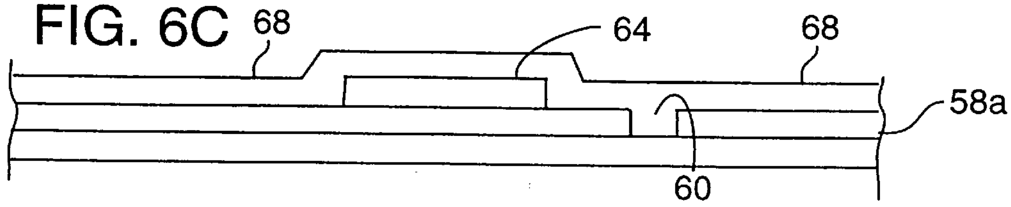
Figure 6D:
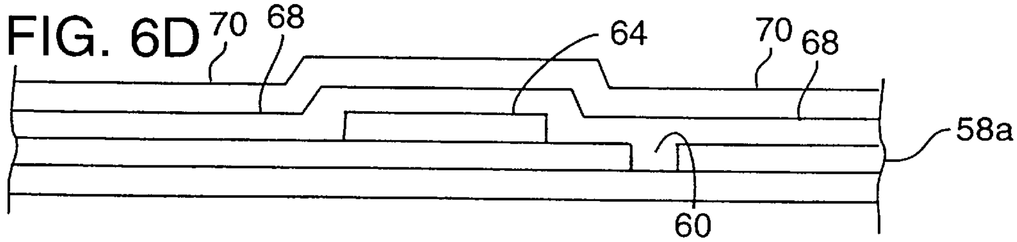

In a preferred embodiment, the valve member is bimetallic. Accordingly, a first or inner metal layer 68 is deposited upon both the substrate 58 and the patterned sacrificial layer 64 (FIG. 6C). The inner metal layer 68 fills the via 60 providing electrical connection with the traces layer, hence between the microprocessor and valve member 32 through the substrate 58. A second or outer metal layer 70 is deposited over the inner metal layer 68 (FIG. 6D). Both the inner and outer metal layers are preferably sputter deposited in thicknesses of 1 to 4 microns per layer. Preferred metal layers comprise aluminum, palladium, gold, platinum, tantalum and mixtures thereof.

Figure 6E:
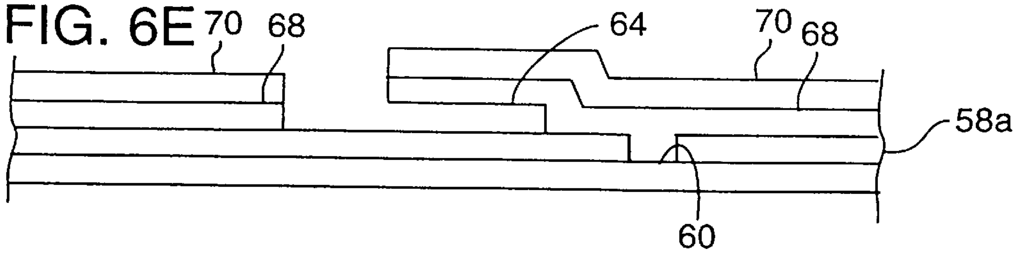

A positive or negative photoresist layer is deposited on the outer metal layer 70. The photoresist layer is patterned to define in the metal layers 68, 70, the shape of a valve member 32. Specifically, both the inner layer 68 and outer layer 70 are etched through on two sides of the sacrificial oxide layer 64, thereby defining the free end 36 of the valve member 32. The sacrificial layer 64 is then removed, releasing the free end 36 and sides of the valve member from contact with the substrate 58 (FIG. 6E).

In another preferred embodiment of the present invention, the outer layer 70 comprises a baked polyimide layer. The polyimide layer 70 is preferably 2 to 8 mm microns in thickness. The inner metal layer 68 acts as a thermally conductive heating element. The fabrication process parallels the fabrication process above, with the exception that the inner (metal) layer 68 and the outer (polyimide) layer 70 must be etched separately. Moreover, the polyimide layer is baked (e.g., heated between 130° and 220° C. for about 30 minutes), prior to etching to define the valve member 32.

In yet another preferred embodiment, both the inner and outer layers comprise baked polyimide layers (FIGS. 4 and 5). A third, middle layer, of highly conductive material acts as the heating element 44, 144, 244. The fabrication process for this embodiment is shown generally in FIGS. 7A–7F, whereby a thin film stack (substrate) 158 is first masked with positive or negative photoresist. The photoresist is patterned, and the substrate is anisotropically etched through the passivation layer 162 to define a via 160. The via 160 provides for connection of the valve member to electrical traces within the substrate 158.

A sacrificial layer 164 is deposited using LPCVD, PECVD or a spin-on process.

The sacrificial layer 164 is preferably a low temperature oxide, but may also comprise a layer of photoresist or polyimide. Preferably, the sacrificial layer 164 is 1 to 2 microns in thickness. The sacrificial layer 164 is patterned and etched to define what will become a clearance space directly beneath the valve member (FIG. 7F). The patterned sacrificial layer 164 will be removed later in the fabrication process to enable the free end 136 of the valve member to move in a direction away from the substrate 158.

Figure 7A:
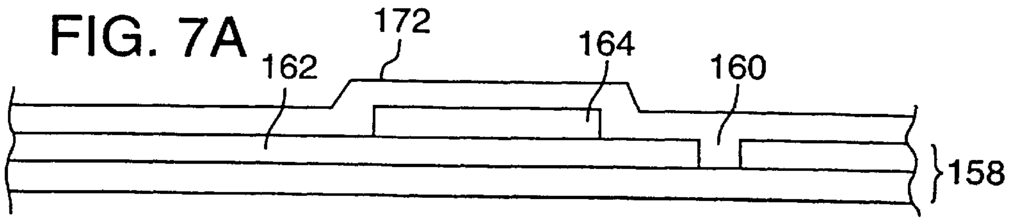
FIGS. 7A–F are section diagrams depicting fabrication of another embodiment of the present invention.
Figure 7B:
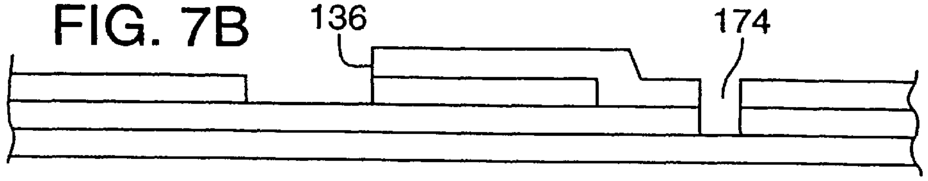
Figure 7C:
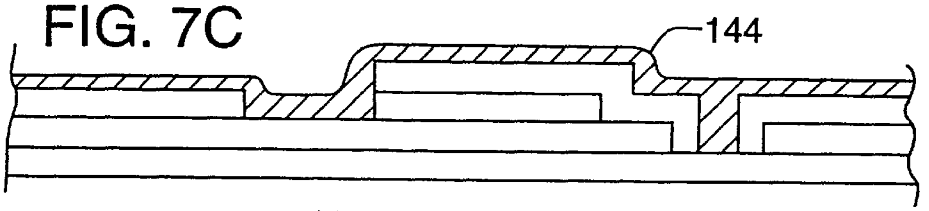
Figure 7D:
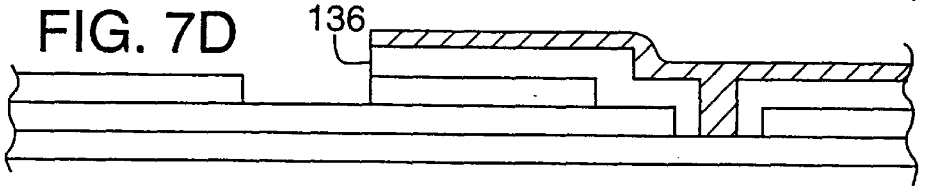

A first polyimide layer 172 is deposited upon both the substrate 158 and the patterned sacrificial layer 164 (FIG. 7A). The first polyimide layer 172 fills the via 160. The polyimide layer 172 is baked at about 200° C. for about 30 minutes, patterned and etched on two sides of the sacrificial layer to define the valve member including its free end 136. The inner polyimide layer 172 is also patterned and etched to create a second via 174 (FIG. 7B). A thin layer of conductive material 144 is deposited, preferably by a sputtering process (FIG. 7C). The layer of conductive material acts as the heating element 144, and is preferably, about 1 micron in thickness. The heating element layer 144 is then patterned and etched to conform to the shape of the valve member (FIG. 7D).

Figure 7E:
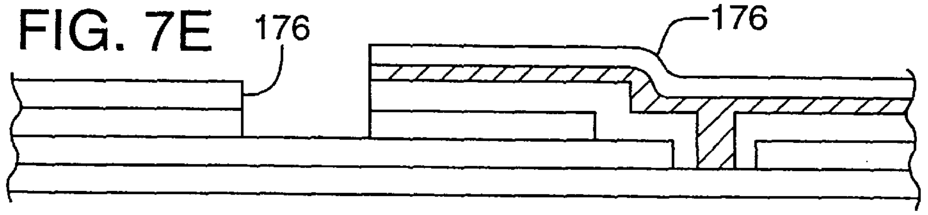
Figure 7F:
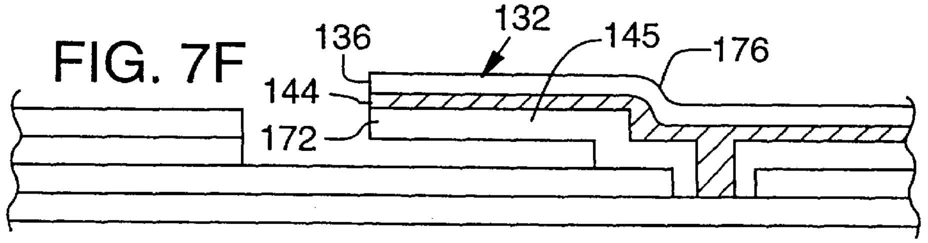

An outer layer of polyimide 176 is deposited, patterned and etched to conform to the shape of the valve member (FIG. 7E). The outer polyimide layer 176 is baked at a lower temperature (e.g. 100° C.) relative to the inner polyimide layer 172. The higher the baking temperature of the polyimide layer, the higher the coefficient of thermal expansion of the polyimide. As discussed above, the differing thermal conductivities of the valve member layers determines the direction and extent of deflection of the valve member.

Lastly, the sacrificial layer 164 is removed, enabling the free end 136 of the valve member to move in a direction away from the substrate 158 (FIG. 7F).

It will be appreciated that for the embodiment of FIG. 5, the valve assembly is constructed so that the nozzles 122 are oriented to be adjacent to one side 145 of the valve member 132. The thickness of that side 145 (measured top to bottom in FIG. 7F) must, therefore, be slightly greater than the diameter of the nozzle so that the flow of ink through the channel 128 and the nozzle 122 will be occluded when the valve member is closed (solid lines FIG. 5).

Similarly, it will be appreciated that for the embodiment of FIG. 8, the valve assembly is constructed so that the ink inlet 246 is oriented adjacent to the lower side 247 of the valve member 232. The thickness of that side 247 is slightly greater than the diameter of the ink inlet 246 so that the flow of ink will be occluded when the valve member 232 is closed.

Having described and illustrated the principles of the invention with reference to preferred embodiments, it should be apparent that the invention can be further modified in arrangement and detail without departing from such principles.

What is claimed is:

1. A method of fabricating a valve assembly on a substrate, comprising the steps of:

depositing a sacrificial oxide layer onto a substrate;

depositing on the sacrificial layer a deformable, thermally conductive first layer;

depositing on the first layer a deformable, thermally conductive second layer, wherein the second layer has a different coefficient of thermal expansion relative to the first layer;

etching the first layer and the second layer to define a valve member; and removing the sacrificial oxide layer thereby freeing part of the first and second layers from the substrate; and connecting the valve member to a heat conductor for heating at least one of the first and second layers.

2. The method of fabricating a valve assembly according to claim 1, wherein the steps of depositing the first layer and the second layer comprise:

depositing a first metal layer having a first coefficient of thermal expansion; and depositing a second metal layer having a second coefficient of thermal expansion.

* * * * *